Patented Jan. 17, 1939

2,144,297

UNITED STATES PATENT OFFICE 2,144,297

MANUFACTURE OF TANNING MATERIALS

Hermann Noerr and Gustav Mauthe, Leverkusen-I. G. Werk, Germany, assignors to I. G. Farbenindustrie Aktiengesellschaft, Frankfort-on-the-Main, Germany No Drawing. Application September 10, 1935, Serial No. 39,999. In Germany September 12, 1934

20 Claims. (Cl. 149—5)

The present invention relates to the manufacture of new condensation products from lignin sulfonic acid having a tanning action.

It is known that the waste liquors obtained as by-products in the manufacture of cellulose according to the sulfite process, owing to their content of lignin sulfonic acid, have some tanning action on animal hides and skins. However, this tanning action is not sufficient in order to yield thorough tannings. The leathers obtained by using sulfite cellulose waste liquor are stiff, badly filled and the tanning material, in consequence of its hydrophile character, is easily washed out from them. Therefore, sulfite cellulose waste liquors could hitherto be employed in the leather industry only as assisting agents in combination with actual tanning materials like vegetable extracts.

We have now found that the hydrophile character of lignin sulfonic acid and sulfite cellulose waste liquors especially, can be very much reduced and their tanning capacity greatly improved by treating the said materials with the condensation product of an aromatic hydroxy compound and a condensing agent being capable of linking aromatic nuclei and being selected from the group of suitable organic compounds, sulfur and sulfur halogen compounds.

In this manner, for instance, by simply adding such a condensation product to sulfite cellulose liquor of about 25–35° Bé. and, if desired, heating the mixture for a short time, products are obtained which, as regards their tanning action, are comparable with known vegetable tanning materials like quebracho extracts.

The condensation products to be incorporated with the sulfite cellulose waste liquors according to the present invention are obtainable from aromatic hydroxy compounds as, for instance, phenols, their homologues, analogues and substitution products and organic condensing agents like formaldehyde, substances yielding formaldehyde on decomposition, acetaldehyde, trichloroacetaldehyde, acetone, dichloracetone, $\alpha$-, $\beta$-dichlorodiethylether, glyoxal and the like. Instead of the organic condensing agents also sulfur or a suitable sulfur halogen compound, e. g. sulfurchloride or sulfurdichloride, may be employed in the preparation of the condensation products used as starting material.

The properties of the resulting products will vary to some extent according to the quality of the sulfite cellulose waste liquor employed. It is known that such liquors, depending on the sulfite cellulose process they come from and on the further treatment they have undergone, show somewhat different properties, for instance as regards their content of dry material and ash. Sulfite liquors which during their process of manufacture have been freed to some extent from calcium and ferric salts have proved to be especially suitable for the purpose of our invention.

The conditions under which the said treatment of the sulfite cellulose waste liquors is to be performed may be varied within wide limits. We have found, however, that especially good results are obtained if such condensation products of aromatic hydroxy compounds are used which have been prepared under comparatively mild conditions and do not possess, therefore, a too high degree of condensation. As it is well known in the art the condensation degree of such artificial resinous substances depends on many factors such as temperature, pressure, time, the kind and the relative proportion of the condensing agent etc.; these factors may easily be so chosen by anyone skilled in the art that suitable products of medium degree of condensation are obtained which are still capable of being dispersed in the sulfite cellulose liquor. The products may be tested for their suitability by the following method: If sulfite cellulose liquor is added in small portions to the molten resinous condensation product there will first be formed a liquor-in-resin emulsion which, at a certain point of transition, will change into a resin-in-liquor emulsion. The latter, when diluted with water will yield an opaque to clear solution which, on acidifying, does not or only in small quantities separates insoluble precipitates in the cold. On the other hand, the product readily precipitates gelatine from its solutions.

Also the relative proportions of the reaction components may be varied within certain limits; preferably about 3–6 parts of sulfite cellulose waste liquor (calculated on the dry weight) to one part of the resinous condensation product are employed. In some cases it may be desirable to aftertreat the reaction product of resin and sulfite liquor with a further quantity of a condensing agent, e. g., glyoxal, formaldehyde or substances yielding formaldehyde like p-formaldehyde, methylol compounds and the like, if necessary at elevated temperature and/or pressure and/or in the presence of catalysts.

The new condensation products prepared according to our invention can be applied in the leather industry in the same way as the hitherto used vegetable tannins, alone or in combination with other tanning materials like mineral salts, natural and synthetic tanning agents etc. The leathers obtained by using the present products are evenly and thoroughly tanned; they dry softly, are well filled and are pliable without breaking. In all respects they are quite similar to those prepared with the aid of vegetable tannins like quebracho or chestnut extracts. They are especially suitable for tanning heavy leathers, for instance those used in the manufacture of shoe-soles. The tanning agents according to our invention are not washed out of the leather, even if the same is treated with water for a prolonged time.

The following examples illustrate the invention without limiting it thereto, the parts being by weight:

Example 1

24 parts of dihydroxydiphenylmethane are heated for a short time with 124 parts of sulfite cellulose liquor (thickened, of about 35° Bé.) while stirring. A complete mixture occurs. After diluting with water the reaction product yields clear colloidal solutions which, after acidifying, display a good tanning action.

Example 2

188 parts of phenol, 100 parts of formaldehyde and 60 parts of caustic soda lye (36% NaOH) are gradually heated to 100° C. until the smell of formaldehyde has nearly disappeared. The product is then salted out. 15 parts of the resinous condensation product thus obtained are added to 120 parts of sulfite cellulose liquor (thickened, of about 35° Bé.) while heating. Well soluble products are obtained which, after acidifying, show a good tanning action.

Example 3

24 parts of the phenol resin obtained according to Example 2, are heated with 164 parts of sulfite cellulose liquor of 35° Bé. and 10 parts of formaldehyde while stirring, until the odor of formaldehyde has nearly disappeared. With this product, on acidifying, well filled leathers having good mechanical properties are obtained.

Example 4

94 parts of phenol are added to 23 parts of chloroacetone. The temperature is maintained for some time at about 100° C. until no more hydrochloric acid is evolved. A viscous mass is obtained which can be mixed homogeneously with sulfite cellulose liquor while heating. 25 parts of the resinous condensation product thus obtained are mixed with 100 parts of sulfite cellulose liquor of 35° Bé. in this manner. The resulting product yields nearly clear solutions in water which, after acidifying, have a good tanning action.

Example 5

108 parts of cresol are heated with 50 parts of 30% aqueous formaldehyde and 100 parts of water in the presence of 10 parts of 20% aqueous hydrochloric acid while gradually increasing the temperature to 90° C. A liquid resin precipitates, 20 parts of which are mixed with 150 parts of sulfite cellulose liquor of 35° Bé. while stirring. The reaction product thus obtained, on dilution with water and acidifying, yields milky opaque solutions and shows a good tanning action.

Example 6

To 200 parts of a technical mixture of chlorophenols are added 700 parts of glacial acetic acid, 468 parts of sulfuric acid monohydrate and at least 77 parts of formaldehyde (techn. 30%) at about 35° C. After heating for about 6 hours at 60–70° C. the mixture is cooled and poured on ice. A soft resinous mass precipitates which is dissolved in diluted soda lye. After acidifying the solution with hydrochloric acid, there separates an oily mass of which 20 parts are intimately mixed with 150 parts of sulfite cellulose liquor of 35° Bé. while heating. The reaction product yields milky solutions with water. With its aid clear leathers being very fast to the action of light are obtained.

Example 7

145 parts of a resin being prepared of crude cresol and trichloroacetaldehyde as described in "Journal für praktische Chemie" (2), 47, 60 (instead of the trichloracetaldehydehydrate the trichloracetaldehyde itself may be employed with preference), are mixed by stirring with 910 parts of sulfite cellulose liquor. Afterwards 120 ccm. of formaldehyde are added. The mixture is heated for 3 hours to 70° C. After acidifying the tanning material, being clearly soluble in water, yields soft and well filled leathers.

Example 8

A suspension of 320 parts of salicylic acid in 1800 parts of a 50% sulfuric acid and 150 parts of formaldehyde (30%) is boiled for 20 hours while stirring. The condensation product is filtered off and washed out with hot water. 100 parts of the product obtained are dissolved in 50 parts of soda lye of 35° Bé. by adding water, and precipitated by adding 100 parts of hydrochloric acid (20%). The precipitate is washed out, filtered off and treated with 700 parts of sulfite cellulose liquor of 32° Bé. (free from lime and iron) while heating a short time. A viscous mass is obtained which can be diluted with water. After acidifying with formic acid the solutions may be used for tanning in the usual way.

Example 9

350 parts of sulfur monochloride are added drop by drop to 470 parts of phenol at 70° C. The temperature is maintained for about 4 hours while stirring, until the evolution of hydrochloric acid has come to an end. The hydrochloric acid still remaining in the mixture is removed by heating in vacuo or by passing a current of hot air through the reaction mixture. 24 parts of the resinous condensation product thus obtained are caused to react with 124 parts of crude sulfite cellulose liquor of 35° Bé. while stirring and, if desired, with short heating. The reaction mixture being no longer liquid is easily soluble in water. On diluting and acidifying until the reaction is weakly acid to Congo red, a tanning material is obtained with the aid of which good light brown leathers are obtained.

Example 10

550 parts of crude cresol are dissolved in 1500 parts of benzene. 675 parts of sulphur monochloride are added drop by drop to the solution at 40–50° C. The temperature is maintained for some hours while stirring until the evolution of hydrochloric acid has ceased. The benzene is removed by evaporation in vacuo. The remaining resinous condensation product is dried at 80° C. 36 parts of the resin obtained are caused to react with 124 parts of crude sulfite cellulose liquor at 35° Bé., if desired, with short heating.

The product thus obtained yields on dilution with water milky opalescent solutions which, after the pH-value has been brought to about 4, have a good tanning action. The leather obtained therewith exhibits a good fullness, good mechanical properties and a light color.

Example 11

A mixture of 387 parts of chlorphenol, 96 parts of sulfur, and 186 parts of caustic soda lye is boiled under reflux for 40 hours. The inside temperature is 115° C. The reaction product is washed twice with water. For the removal of any chlorphenol which is not yet converted, the resinous condensation product is, after adding 50 ccm. of conc. hydrochloric acid, distilled with steam for 2 hours. 24 parts of the resin thus obtained are caused to react with 170 parts of sulfite cellulose liquor (of low ash content) of 24° Bé. while stirring. A homogeneous viscous mass is obtained which, on dilution with water, yields milky solutions which show scarcely any sedimentation. When used in solutions of a pH-value of about 3.5 they are excellent tanning agents. The leathers obtained are of whitish-grey color and show a great fastness to light.

Example 12

210 parts of sulphur monochloride are added drop by drop to 324 parts of crude cresol at 70° C. The temperature is maintained for 4 hours until the evolution of hydrochloric acid has ceased. The hydrochloric acid still remaining in the mixture is removed by heating in vacuo or by passing hot air through the reaction mixture. 24 parts of the resinous condensation product thus obtained, 10 parts of formaldehyde and 124 parts of crude sulfite cellulose liquor of 35° Bé. are heated for several hours. A water soluble product is obtained which, on acidifying until the reaction is weakly acid to Congo red, possesses a good tanning power.

Example 13

550 parts of cresol are dissolved in 1000 parts of benzene. 350 parts of sulphur monochloride being dissolved in 500 parts of benzene are added to this solution at 10–15° C., while stirring until the evolution of hydrochloric acid has ceased. The mixture is washed several times until the hydrochloric acid is removed. The benzene is removed with steam and, after cooling, the soft resinous condensation product is separated from water. 36 parts of the resinous condensation product thus obtained are caused to react with 124 parts of sulfite cellulose liquor while heating. The preparation thus obtained, on dilution in water, yields clear solutions which, after the pH-value has been brought to about 4, have a good tanning action. The leather obtained exhibits a good fullness, good mechanical properties and a light color.

We claim:

1. The process of preparing tanning substances which comprises treating lignin sulfonic acid with a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in the lignin sulfonic acid solution.

2. The process of preparing tanning substances which comprises incorporating with sulfite cellulose waste liquor a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in sulfite cellulose waste liquor.

3. The process of preparing tanning substances which comprises incorporating a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in sulfite cellulose waste liquor with sulfite cellulose waste liquor, and after treating the resulting product with a further quantity of a condensing agent.

4. The process of preparing tanning substances which comprises incorporating with sulfite cellulose waste liquor a condensation product of an aromatic hydroxy compound containing only one OH-group per benzene nucleus and an organic condensing agent known to be capable of linking aromatic nuclei said condensation product being free from sulfonic acid groups and being dispersible in sulfite cellulose waste liquor.

5. The process of preparing tanning substances which comprises incorporating with sulfite cellulose waste liquor of from 25 to 35° Bé. a condensation product of an aromatic hydroxy compound containing only one OH-group per benzene nucleus and formaldehyde said condensation product being free from sulfonic acid groups and being dispersible in sulfite cellulose waste liquor.

6. The process of preparing tanning substances which comprises incorporating with sulfite cellulose waste liquor of from 25 to 35° Bé. a condensation product of an aromatic hydroxy compound containing only one OH-group per benzene nucleus and a halogen containing aliphatic condensing agent capable of linking aromatic nuclei said condensation product being free from sulfonic acid groups and being dispersible in sulfite cellulose waste liquor.

7. The process of preparing tanning substances which comprises incorporating with sulfite cellulose waste liquor of from 25 to 35° Bé. a condensation product of an aromatic hydroxy compound containing only one OH-group per benzene nucleus and a sulfur containing condensing agent capable of linking aromatic nuclei said condensation product being free from sulfonic acid groups and being dispersible in sulfite cellulose waste liquor.

8. As a new product for use as a tanning substance the product obtainable by incorporating with lignin sulfonic acid a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in the lignin sulfonic acid solution.

9. As a new product for use as a tanning substance the product obtainable by incorporating with sulfite cellulose waste liquor a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in sulfite cellulose waste liquor.

10. As a new product for use as a tanning substance the product which is substantially identical with that obtainable by aftertreating with a condensing agent a sulfite cellulose waste liquor having dispersed therein a condensation product of an aromatic hydroxy compound containing only one OH-group per benzene nucleus and a condensing agent known to be capable of linking aromatic nuclei said condensing agent being selected from the group consisting of organic compounds, sulfur and sulfur halogen compounds said condensation product being free from sulfonic acid groups and being dispersible in sulfite cellulose waste liquor.

11. As a new product for use as a tanning substance the product obtainable by incorporating with sulfite cellulose waste liquor a condensation product of an aromatic hydroxy compound containing only one OH-group per benzene nucleus and an organic condensing agent known to be capable of linking aromatic nuclei said condensation product being free from sulfonic acid groups and being dispersible in sulfite cellulose waste liquor.

12. As a new product for use as a tanning substance the product obtainable by incorporating with sulfite cellulose waste liquor of from 25 to 35° Bé. a condensation product of an aromatic hydroxy compound containing only one OH-group per benzene nucleus and formaldehyde said condensation product being free from sulfonic acid groups and being dispersible in sulfite cellulose waste liquor.

13. As a new product for use as a tanning substance the product obtainable by incorporating with sulfite cellulose waste liquor of from 25 to 35° Bé. a condensation product of a phenol and formaldehyde said condensation product being free from sulfonic acid groups and being dispersible in sulfite cellulose waste liquor.

14. As a new product for use as a tanning substance the product obtainable by incorporating with purified sulfite cellulose waste liquor of from 25 to 35° Bé. a condensation product of a phenol and formaldehyde said condensation product being free from sulfonic acid groups and being dispersible in sulfite cellulose waste liquor.

15. As a new product for use as a tanning substance the product obtainable by incorporating with sulfite cellulose waste liquor of from 25 to 35° Bé. a condensation product of an aromatic hydroxy compound containing only one OH-group per benzene nucleus and a halogen containing aliphatic condensing agent capable of linking aromatic nuclei said condensation product being free from sulfonic acid groups and being dispersible in sulfite cellulose waste liquor.

16. As a new product for use as a tanning substance the product obtainable by incorporating with sulfite cellulose waste liquor of from 25 to 35° Bé. a condensation product of a phenol and $\alpha$-, $\beta$-dichlordiethylether said condensation product being free from sulfonic acid groups and being dispersible in sulfite cellulose waste liquor.

17. As a new product for use as a tanning substance the product obtainable by incorporating with purified sulfite cellulose waste liquor of from 25 to 35° Bé. a condensation product of a phenol and $\alpha$-, $\beta$-dichlordiethylether said condensation product being free from sulfonic acid groups and being dispersible in sulfite cellulose waste liquor.

18. As a new product for use as a tanning substance the product obtainable by incorporating with sulfite cellulose waste liquor of from 25 to 35° Bé. a condensation product of an aromatic hydroxy compound containing only one OH-group per benzene nucleus and a sulfur containing condensing agent capable of linking aromatic nuclei said condensation product being free from sulfonic acid groups and being dispersible in sulfite cellulose waste liquor.

19. As a new product for use as a tanning substance the product obtainable by incorporating with sulfite cellulose waste liquor of from 25 to 35° Bé. a condensation product of an aromatic hydroxy compound containing only one OH-group per benzene nucleus and a sulfur halogen compound capable of linking aromatic nuclei said condensation product being free from sulfonic acid groups and being dispersible in sulfite cellulose waste liquor.

20. As a new product for use as a tanning substance the product obtainable by incorporating with sulfite cellulose waste liquor of from 25 to 35° Bé. a condensation product of a phenol and sulphur monochloride said condensation product being free from sulfonic acid groups and being dispersible in sulfite cellulose waste liquor.

HERMANN NOERR.
GUSTAV MAUTHE.